US008676948B2

(12) United States Patent
Li

(10) Patent No.: US 8,676,948 B2
(45) Date of Patent: Mar. 18, 2014

(54) METHOD FOR TUNNEL MAPPING

(75) Inventor: Dingjun Li, Shenzhen (CN)

(73) Assignee: ZTE Corporation (CN)

( * ) Notice: Subject to any disclaimer, the term of this patent is extended or adjusted under 35 U.S.C. 154(b) by 502 days.

(21) Appl. No.: 12/741,607

(22) PCT Filed: May 23, 2008

(86) PCT No.: PCT/CN2008/071059
§ 371 (c)(1),
(2), (4) Date: May 6, 2010

(87) PCT Pub. No.: WO2009/062404
PCT Pub. Date: May 22, 2009

(65) Prior Publication Data
US 2010/0268837 A1   Oct. 21, 2010

(30) Foreign Application Priority Data
Nov. 12, 2007   (CN) .......................... 2007 1 0124719

(51) Int. Cl.
*G06F 15/173*   (2006.01)
(52) U.S. Cl.
USPC ........................................................ 709/223
(58) Field of Classification Search
USPC ........................................................ 709/223
See application file for complete search history.

(56) References Cited

U.S. PATENT DOCUMENTS

| | | | |
|---|---|---|---|
| 7,061,896 B2 | 6/2006 | Jabbari et al. | |
| 7,515,546 B2 * | 4/2009 | Gaspard et al. | 370/252 |
| 7,782,764 B2 * | 8/2010 | Zi | 370/218 |
| 7,782,854 B2 * | 8/2010 | Sakata et al. | 370/392 |
| 7,903,553 B2 * | 3/2011 | Liu | 370/230.1 |
| 2002/0110087 A1 * | 8/2002 | Zelig et al. | 370/236 |
| 2005/0089034 A1 * | 4/2005 | Sakata et al. | 370/389 |
| 2006/0050719 A1 * | 3/2006 | Barr et al. | 370/401 |

(Continued)

FOREIGN PATENT DOCUMENTS

| | | |
|---|---|---|
| CN | 1464705 A | 12/2003 |
| CN | 1738288 A | 2/2006 |

(Continued)

OTHER PUBLICATIONS

Song et al, "Overview of ITU-T NGN QoS Control", Sep. 2007, 116-123.*

(Continued)

*Primary Examiner* — Karen Tang
(74) *Attorney, Agent, or Firm* — Brooks Kushman, P.C.

(57) ABSTRACT

The present invention discloses a method for tunnel mapping involved with the field of the next generation network. The method of the present invention comprises: according to a service data stream resource information request received, selecting, by a transport resource control function entity (TRC-FE), a corresponding label switch path (LSP) tunnel, and after completing allocation of the service data stream, instructing a transport resource enforcement function entity (TRE-FE) to update a stream label mapping table; and completing, by the TRE-FE, the update of the stream label mapping table, and according to mapping information in the table, mapping the service data stream to the LSP tunnel designated. The present invention solves the problem that a mapping between a service data stream and LSP tunnel resource in a NGN based on MPLS-TE can't be implemented according to current standards, and fills a gap in implementation of resource allocation in a bearer network.

12 Claims, 2 Drawing Sheets

(56) References Cited

U.S. PATENT DOCUMENTS

| | | | |
|---|---|---|---|
| 2006/0250951 A1* | 11/2006 | Ueda et al. | 370/217 |
| 2007/0076732 A1 | 4/2007 | Kim | |
| 2008/0025218 A1* | 1/2008 | Liu | 370/235 |
| 2008/0137654 A1* | 6/2008 | Lee et al. | 370/389 |
| 2010/0067530 A1* | 3/2010 | Arai et al. | 370/392 |

FOREIGN PATENT DOCUMENTS

| | | |
|---|---|---|
| CN | 1777140 A | 5/2006 |
| CN | 1794691 A | 6/2006 |
| CN | 1805364 A | 7/2006 |
| CN | 1808986 A | 7/2006 |
| CN | 1812367 A | 8/2006 |
| CN | 1863162 A | 11/2006 |
| CN | 1889582 A | 1/2007 |
| CN | 1921453 A | 2/2007 |
| CN | 101014008 A | 8/2007 |
| CN | 101052011 A | 10/2007 |
| CN | 101053223 A | 10/2007 |
| CN | 101127718 A | 2/2008 |
| CN | 101132642 A | 2/2008 |
| CN | 101163098 A | 4/2008 |
| CN | 101163099 A | 4/2008 |
| CN | 101163100 A | 4/2008 |
| EP | 1 239 636 A1 | 11/2002 |
| KR | 1020070064845 A | 6/2007 |

OTHER PUBLICATIONS

Huang Hexian, et al., Resource and Admission Control in NGN, ZTE Communications, Mar. 21, 2007, pp. 1-27, vol. 1, China.

* cited by examiner

METHOD FOR TUNNEL MAPPING

TECHNICAL FIELD

The present invention relates to the field of the next generation network, and in particular, to a method for tunnel mapping.

BACKGROUND OF THE INVENTION

At present, in either the definition (Y.RACF-Y.2111 Standard) of ITU-NGN (International Telecommunication Union Next Generation Network) resource allocation and control function subsystem-RACF (Resource Admission Control Function) or the definition (Y.MPLS-RACF Standard) of RACF based on MPLS-TE (Multi-Protocol Label Switch Traffic Engineering), there is no specific definition of how a mapping between a MPLS-LSP (Label Switch Path) tunnel and a service data stream is implemented to achieve service assurance of the service data stream.

FIG. 1 is a block diagram of an ITU-T NGN RACF in the prior art, comprising a TRE-FE (Transport Resource Enforcement Function Entity), a PE-FE (Policy Enforcement Function Entity), a TRC-FE (Transport Resource Control Function Entity), a PD-FE (Policy Decision Function Entity) and a RACF.

In FIG. 1, an interface Rs is in charge of the interaction related to service session abstract resource request between a service control layer and the policy decision function entity (PD-FE) in a transport network control layer; an interface Rt is in charge of the interaction related to session network resource request and allocation between the policy decision function entity (PD-FE) and the transport resource control function entity (TRC-FE); an interface Rw is in charge of delivering corresponding policies, such as stream limited rates, stream marks, gateway functions, between the policy decision function entity (PD-FE) and the policy enforcement function entity (PE-FE) in a transport layer; and an interface Rc is in charge of collecting information of network topology and resources in the transport network and collecting feedbacks of the use of the resources during network operation.

However, in current ITU-T NGNs, there is neither a specific definition of how a mapping between a MPLS-LSP tunnel and a service data stream is implemented to achieve service assurance of the service data stream, nor a specific definition of functions of an interface Rn.

Therefore, the prior art needs to be improved and developed.

SUMMARY OF THE INVENTION

The technical problem to be solved in present invention is to provide a method for tunnel mapping, which can map a service data stream to a MPLS LSP tunnel in a NGN network based on MPLS-TE, to achieve service assurance of the service data stream.

In order to solve the above technical problem, the present invention provides a method for tunnel mapping, comprising steps of:

according to a service data stream resource information request received, selecting, by a transport resource control function entity (TRC-FE), a corresponding label switch path (LSP) tunnel, and after completing allocation of said service data stream, instructing a transport resource enforcement function entity (TRE-FE) to update a stream label mapping table; and completing, by said TRE-FE, the update of said stream label mapping table, and according to mapping information in the table, mapping said service data stream to the LSP tunnel designated.

Furthermore, in the above method, after receiving said service data stream resource information request sent by a policy decision function entity (PD-FE) or other entities, said TRC-FE completes the allocation of said service data stream according to resource information of multi-protocol label switch (MPLS) LSP in the request.

The above method further comprises the following steps after said TRE-FE maps said service data stream to the LSP tunnel designated:

after receiving a service suspension message sent by a PD-FE or other entities, instructing, by said TRC-FE, said TRE-FE to cancel the mapping of said service data stream to said LSP; and after receiving information of canceling the mapping, canceling, by said TRE-FE, the mapping between said service data stream and said LSP path.

Furthermore, in the above method, the update of said stream label mapping table by said TRE-FE refers to creating, by said TRE-FE, an entry of the mapping between said service data stream and said LSP tunnel according to said instruction.

Furthermore, in the above method, said TRC-FE instructs said TRE-FE to update said stream label mapping table through a Rn interface, and the instruction further carries information of an IP 5-tuple of said service data stream and the allocated LSP tunnel.

Furthermore, in the above method, said TRE-FE is a TRE-FE in a head node of said LSP tunnel.

Furthermore, in the above method, said other entities are transport resource enforcement function entities or policy enforcement function entities.

The above method further comprises:

creating, by said TRE-FE, a stream label mapping table according to said instruction if there is no stream label mapping table.

In the present invention, through an interface Rn, a TRC-FE notifies a TRE-FE situated in a LSP head node of information for mapping a service data stream to a LSP tunnel allocated by it, to achieve the mapping between the service data stream and the MPLS LSP tunnel, thus the problem that a mapping between a service data stream and LSP tunnel resource in a NGN network based on MPLS-TE can't be implemented according to current standards is addressed, and a gap in implementation of resource allocation in a bearer network is filled.

PREFERRED EMBODIMENTS OF THE PRESENT INVENTION

In conjunction with the drawings, an embodiment of the present invention is described in detail below.

The main idea of the present invention is to utilize the TRC-FE, TRE-FE and the interface Rn between them in a RACF subsystem in a NGN to implement the mapping between a service data stream and a MPLS LSP tunnel.

Figure 1:
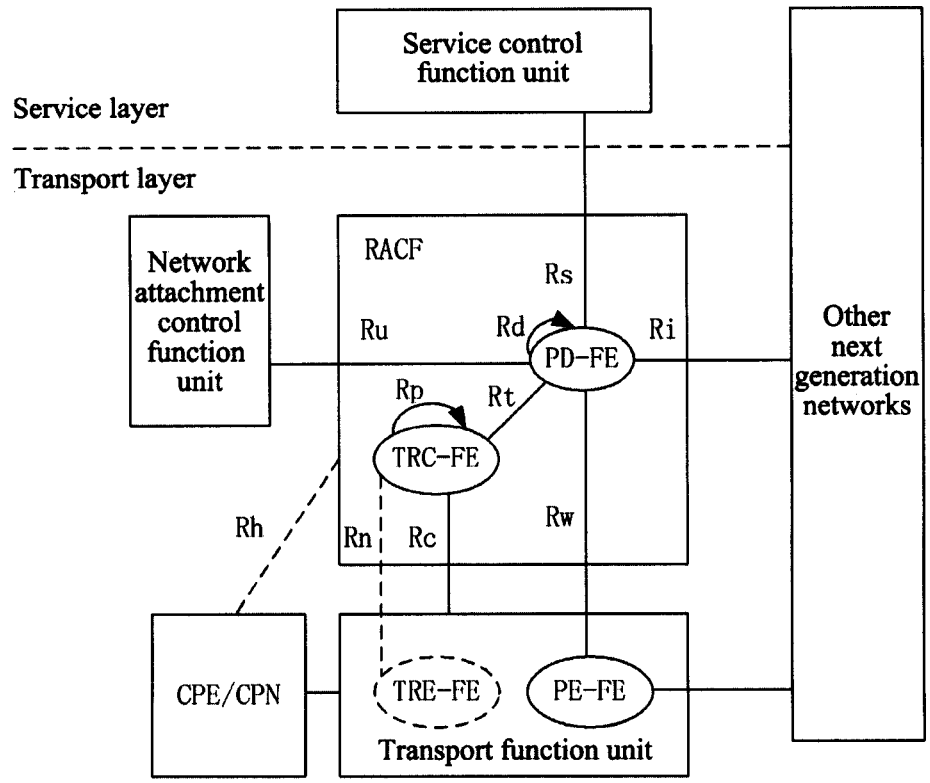
FIG. 1 is a block diagram of a RACF in an ITU-T NGN in the prior art.
Figure 2:
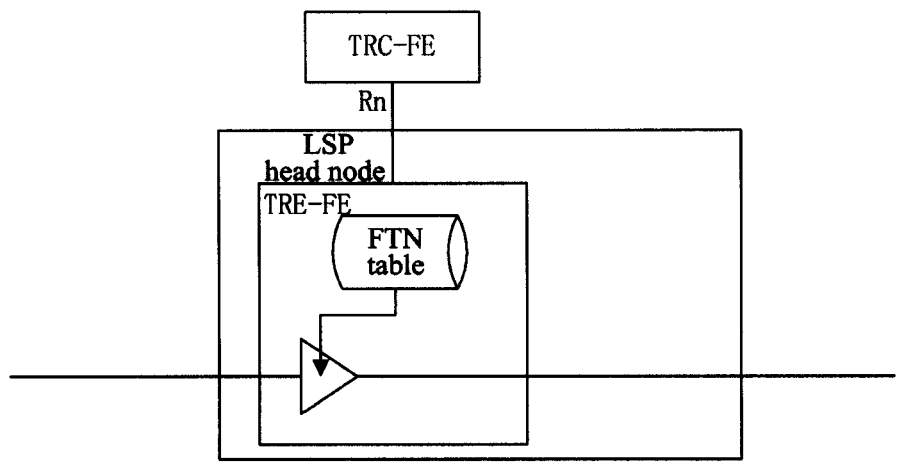
FIG. 2 is a schematic diagram of the mapping between a service data stream and a MPLS LSP tunnel in accordance with the method of the present invention.
Figure 3:
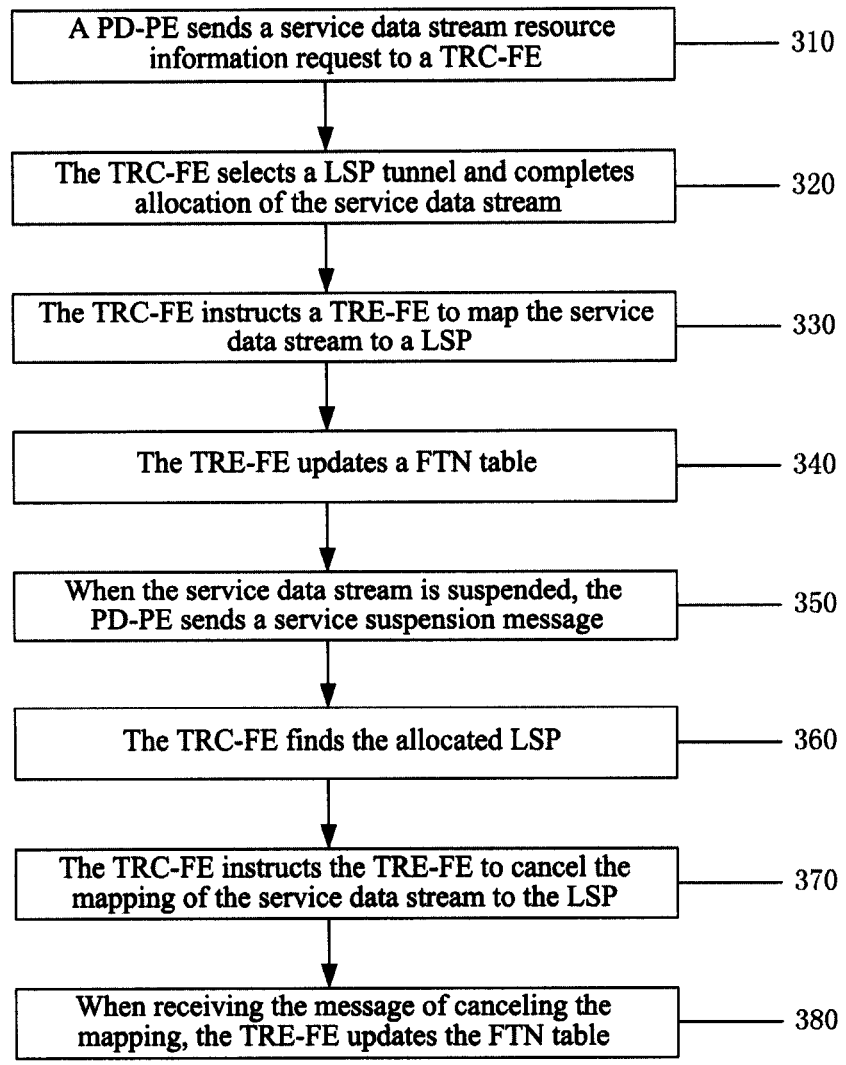
FIG. 3 is an implementation flow diagram of the method of present invention.

As shown in FIG. 3, the present invention provides a method for tunnel mapping to be applied in the field of the next generation network, and the implementation flow of the method comprises the following steps of:

310. sending, by a policy decision function entity (PD-FE) or other entities, a resource information request of a service data stream to a TRC-FE;

wherein, the other entities comprise a transport resource enforcement function entity (TRE-FE) and a policy enforcement function entity (PE-FE);

320. according to the resource information request received, selecting, by the TRC-FE, a corresponding LSP tunnel and completing allocation of the service data stream;

the tunnel selection and service data stream allocation herein can adopt an existing method;

330. after completing the resource allocation for the service data, instructing, by the TRC-FE through a Rn interface, a TRE-FE of the head node of the LSP tunnel to map the service data stream to the LSP tunnel, and notifying it of corresponding information, such as an IP 5-tuple of the service data stream, the allocated LSP tunnel, and so on;

340. when receiving the mapping information, updating, by the TRE-FE of the LSP head node, a FTN table (Forwarding Equivalence Class to Next Hop Label Forwarding Entry), i.e., a stream label mapping table, creating an entry of the mapping between the service data stream and the LSP tunnel, and mapping the service data stream to the LSP when the service data stream reaches the head note, as shown in FIG. 2;

if there is no FTN table, then creating, by the TRE-FE, a FTN table according to the mapping information received;

350. when the service data stream is suspended, sending, by the PD-FE or other entities, a service suspension message to the TRC-FE; wherein, the other entities comprises a transport resource enforcement function entity and a policy enforcement function entity;

360. according to the suspension message, finding, by the TRC-FE, the LSP head node to which the service data stream is allocated;

370. through the interface Rn, instructing, by the TRC-FE, the TRE-FE of the LSP head node to cancel the mapping of the service data stream to the LSP, and notifying it of other corresponding information, such as the IP 5-tuple of the service data stream, the allocated LSP tunnel, and so on;

380. when receiving the information of canceling the mapping, updating, by the TRE-FE of the LSP head node, the FTN table, deleting the entry of the mapping between the service data stream and the LSP tunnel, and restoring the service data stream to the original state.

In summary, according to the method of the present invention, through an interface Rn, a TRC-FE notifies a TRE-FE situated in a LSP head node of information for mapping a service data stream to a LSP tunnel allocated by it, to achieve the mapping between the service data stream and the MPLS LSP tunnel, thus the problem that a mapping between a service data stream and LSP tunnel resource in a NGN network based on MPLS-TE can't be implemented according to current standards is addressed, and a gap in implementation of resource allocation in a bearer network is filled; furthermore, functions of the Rn interface undefined yet is specifically defined.

It should be understood that a person skilled in the art may make improvements or variations based on the above description, but all such improvements and variations should fall into the scope of the appended claims in the present invention.

Industrial Applicability

In the present invention, through an interface Rn, a TRC-FE notifies a TRE-FE situated in a LSP head node of information for mapping a service data stream to a LSP tunnel allocated by it, to achieve the mapping between the service data stream and the MPLS LSP tunnel, thus the problem that a mapping between a service data stream and LSP tunnel resource in a NGN network based on MPLS-TE can't be implemented according to current standards is addressed, and a gap in implementation of resource allocation in a bearer network is filled.

I claim:

1. A method for tunnel mapping, comprising:
   according to a service data stream resource information request received, selecting, by a transport resource control function entity (TRC-FE) in a Resource Admission Control Function (RACF) subsystem of Next Generation Network (NGN), a corresponding label switch path (LSP) tunnel, and after completing allocation of said service data stream, instructing through an Rn interface, by the TRC-FE, a transport resource enforcement function entity (TRE-FE) in the RACF subsystem to update a stream label mapping table according to the allocation; and
   completing, by said TRE-FE, the update of said stream label mapping table, and according to mapping information in the table, mapping said service data stream to the LSP tunnel designated.

2. The method of claim 1, wherein:
   after receiving said service data stream resource information request sent by a policy decision function entity (PD-FE) or other entities, said TRC-FE completes the allocation of said service data stream according to resource information of multi-protocol label switch (MPLS) LSP in the request.

3. The method of claim 1, further comprising the following steps after said TRE-FE maps said service data stream to the LSP tunnel designated:
   after receiving a service suspension message sent by a PD-FE or other entities, instructing, by said TRC-FE, said TRE-FE to cancel the mapping of said service data stream to said LSP; and
   after receiving information of canceling the mapping, canceling, by said TRE-FE, the mapping between said service data stream and said LSP path.

4. The method of claim 1, wherein:
   the update of said stream label mapping table by said TRE-FE refers to creating, by said TRE-FE, an entry of the mapping between said service data stream and said LSP tunnel according to said instruction.

5. The method of claim 1, wherein:
   the instruction further carries information of an IP 5-tuple of said service data stream and the allocated LSP tunnel.

6. The method of claim 1, wherein:
   said TRE-FE is a TRE-FE in a head node of said LSP tunnel.

7. The method of claim 3, wherein:
   said other entities are transport resource enforcement function entities or policy enforcement function entities.

8. The method of claim 1, further comprising:
   creating, by said TRE-FE, a stream label mapping table according to said instruction if there is no stream label mapping table.

9. The method of claim 2, further comprising the following steps after said TRE-FE maps said service data stream to the LSP tunnel designated:

after receiving a service suspension message sent by a PD-FE or other entities, instructing, by said TRC-FE, said TRE-FE to cancel the mapping of said service data stream to said LSP; and after receiving information of canceling the mapping, canceling, by said TRE-FE, the mapping between said service data stream and said LSP path.

10. The method of claim 4, wherein:

the instruction further carries information of an IP 5-tuple of said service data stream and the allocated LSP tunnel.

11. The method of claim 2, wherein:

said TRE-FE is a TRE-FE in a head node of said LSP tunnel.

12. The method of claim 4, wherein:

said TRE-FE is a TRE-FE in a head node of said LSP tunnel.

* * * * *